United States Patent
Saini

(10) Patent No.: US 7,617,162 B2
(45) Date of Patent: Nov. 10, 2009

(54) REAL TIME PUSH NOTIFICATION IN AN EVENT DRIVEN NETWORK

(76) Inventor: Atul Saini, Unit #4, UGF, Innovator Bldg, Whitefield Rd, Bangalore, Karnatak (IN) 560 066

(*) Notice: Subject to any disclaimer, the term of this patent is extended or adjusted under 35 U.S.C. 154(b) by 733 days.

(21) Appl. No.: 11/182,668

(22) Filed: Jul. 15, 2005

(65) Prior Publication Data

US 2006/0200387 A1   Sep. 7, 2006

(51) Int. Cl.
 G06Q 90/00  (2006.01)
 G06Q 30/00  (2006.01)
 G06F 17/00  (2006.01)
(52) U.S. Cl. ............................ 705/500; 705/14; 705/26; 707/3; 709/218
(58) Field of Classification Search ................ 705/14, 705/26, 27, 500; 707/3, 4; 709/218
 See application file for complete search history.

(56) References Cited

U.S. PATENT DOCUMENTS

| | | | |
|---|---|---|---|
| 5,745,882 A | 4/1998 | Bixler | 705/26 |
| 5,974,406 A | 10/1999 | Bisdikian | 707/1 |
| 6,185,611 B1 | 2/2001 | Waldo | 709/221 |
| 6,253,198 B1* | 6/2001 | Perkins | 707/3 |
| 6,591,094 B1 | 7/2003 | Bentley | 455/405 |
| 7,069,308 B2* | 6/2006 | Abrams | 709/218 |
| 7,216,093 B1* | 5/2007 | Gupta et al. | 705/26 |
| 7,424,409 B2* | 9/2008 | Ben-Gal et al. | 703/2 |
| 2002/0042846 A1* | 4/2002 | Bottan et al. | 709/249 |
| 2003/0191650 A1* | 10/2003 | Turner et al. | 705/1 |
| 2003/0229674 A1* | 12/2003 | Cabrera et al. | 709/207 |
| 2004/0107283 A1* | 6/2004 | Paddon | 709/229 |
| 2004/0162064 A1* | 8/2004 | Himmelstein | 455/422.1 |
| 2004/0203923 A1* | 10/2004 | Mullen | 455/456.1 |
| 2004/0205048 A1 | 10/2004 | Pizzo | 707/3 |
| 2006/0031400 A1* | 2/2006 | Yuh et al. | 709/218 |
| 2006/0242291 A1* | 10/2006 | Nevalainen | 709/224 |
| 2008/0091662 A1* | 4/2008 | Franke | 707/3 |

FOREIGN PATENT DOCUMENTS

WO   WO-0073955 A2 * 12/2000

OTHER PUBLICATIONS

McGuire, J.G., et al., "SHADE: Technology for Knowledge-Based Collaborative Engineering" (Abstract only) Concurrent Engineering:Research and Applications, vol. 1, No. 3, pp. 137-146, Sep. 1993.*

(Continued)

Primary Examiner—Nicholas D Rosen
(74) Attorney, Agent, or Firm—Ash Tankha

(57) ABSTRACT

Disclosed herein is a method and system for matching attributes across an event driven network of user applications at the instance of a change in the attribute profiles of a user application. Each user application in the network has a set of one or more updatable attributes. Once a change is made to one or more attributes in the user application, information about the changed attribute is broadcasted to other user applications in the event driven network. A notification manager coordinates the trigger for notification and the matching of the attributes.

20 Claims, 6 Drawing Sheets

OTHER PUBLICATIONS

Anon., "Geac's Interealty.com and Sitesnet.com Partner to Supply Real-Time Data to Real Estate Professionals," CCN Disclosure, Apr. 12, 2000.*

Anon., "PLS Unveils 'Smart' Personal Agent Software," Online, vol. 20, No. 2, p. 10, Mar.-Apr. 1996.*

Anon., "Major Key Components of Verity Search '97 Platform Now Shipping," PR Newswire, p. 1211SFW002, Dec. 11, 1996.*

R.C. Johnson, "Neural Agent Enables Personalized Surfing—Web-based Information Service Employs Algorithms to Discern User' Tastes," Electronic Engineering Times, p. 39, Feb. 9, 1998.*

* cited by examiner

REAL TIME PUSH NOTIFICATION IN AN EVENT DRIVEN NETWORK

BACKGROUND OF THE INVENTION

The method and structure of the implementation of event driven networks fundamentally differ from one another in the type of notification system, type of data storage, location of data storage, security, routing and network topology.

In currently used e-commerce solutions, including peer-to-peer networks, a "pull notification" system is used for deriving a match between the requirements of a buyer and a seller. In a pull notification system, the buyer issues a buy request, which is then matched against the seller's profile at that point in time. However, if a seller does not have a matching product or service at that point in time, the seller has to wait until the search is again initiated by the buyer. However, this method reduces the incidence of a match at the time of posting of the changed attribute and also reduces an eventual match between the buyer and seller. Even if the buyer automates the search to be conducted at short periodic time intervals, during that short time interval the seller loses his or her opportunity to complete the transaction of the product or service if the seller's product or service was not posted for sale during that time interval. Also, if a seller updates their profile and places a product or service on sale that would have matched the buyer's requirements just after a search is conducted by the buyer, the transaction will again not be completed. The seller will now have to wait until the next automatic or manual search is conducted by the buyer after a predetermined time interval. In today's e-commerce networks containing thousands if not millions of users, a fraction of a second lost in the posting of information by sellers on the availability of their product or service can potentially be a significant lost sale opportunity for that seller. In summary, the "pull notification" strategy that is buyer-driven places some sellers at a disadvantage in e-commerce networks. Also, in a large network of users, if automated searches are set by users to be conducted at short periodic time intervals, the network traffic may get over-loaded as a result of the frequent automated notifications.

Typically, in currently available pull notification solutions, all transaction data, for example the details of the buyer and seller are stored in a central database. The user, which may be the buyer or the seller, logs on to the system and searches this central database to determine a match for the user's requirements. When the system finds a match for the user's query, the system notifies the user. If a match is not indicated at that point in time, the user has to re-initiate the search at a later point in time. In the above solution, a central database is required; the local databases of the users' user applications are not utilized for storing data. Even in the case of a pull notification system with a distributed database, typically intelligence is located centrally. A central controller would conduct the predetermined periodically-timed searches of the buyer and would execute the transactions.

In the present push notification invention, the event driven network is brought to the user, thereby empowering all sellers. The user does not have to actively conduct search queries at short periodic time intervals for buy or sell transactions. The user only needs to feed the changed attributes in the attribute profiles of the user's application for conducting a transaction. Once the user changes the buy or sell attribute profile, the notification of the change in attribute is automatically broadcasted in real time to all users of the event driven network. This automatic broadcast of attribute changes in this event driven network will hereafter be referred to as push notification. The user can change the user's attribute profiles even if the user application is not logged on to the event driven network. Once the user application logs on to the event driven network, the notification of the change in attributes is sent to all other users in the event driven network.

The following example illustrates the differences between the pull notification method of existing solutions available today in the market from the push notification system of this invention that is implemented in real time and is event driven. For example, consider an e-commerce event driven network used for buying and selling goods. A buyer desires to purchase a book at a certain sale price using this event driven network. The buyer would send out a search request on the event driven network to find a seller for that book at that sale price at that point in time. Assume that the first search is conducted at 12:00 P.M. and no sellers have that book at the sale price at 12:00 P.M. The buyer then requests the network to automatically conduct a search for the book at one-hour intervals. Therefore, the next search will be conducted at 1:00 P.M. Assume that at 12:59 P.M., Seller A posts the required book at that sale price in the event driven network, and that Seller B posts that book at that sale price at 1:01 P.M. on the same network. When the automated search is conducted at 1:00 P.M., only Seller A's book will show as available for sale on the network to the buyer. Assume that the buyer needs to take a decision on buying the book by 1:30 P.M. In a pull notification system, the transaction for the purchase of the book will be executed through Seller A, because the buyer was not made aware of the availability of the book by Seller B at 1.01 P.M. as the search of the book will not be re-conducted by the buyer from 1 P.M. to 1.30 P.M. Even though Seller B posted his or her book on sale on the network at 1:01 P.M., i.e. just 2 minutes later than Seller A, Seller B lost the opportunity to sell the book to the buyer. This is the disadvantage of the typical pull notification system of currently available solutions. The current pull notification system places some sellers at a disadvantage. However, in the event driven push broadcast notification of this invention, there is no need to conduct a search periodically at predetermined time intervals. If a seller posts a book or updates their attribute profile at a point in time after the search query is conducted but before the execution time of the transaction and where the book meets the requirement of the buyer on sale, the new information is pushed out and broadcasted to other users, i.e., to potential buyers in the network. Hence, under this invention, Seller's B notification of the book at the sale price will be sent to the buyer at 1:01 P.M. and the buyer now can choose between the books of Seller A and Seller B as the buyer will execute the transaction for the purchase of the book at 1:30 P.M.

It may appear that the use of a push notification strategy will result in the event driven network to be flooded with update messages. In reality, the network traffic generated as a result of notification updates of sellers is less than network traffic generated by a majority of the buyers that conduct automated searches at short periodic time intervals in a commercial network using the conventional pull notification method. In current commercial pull notification system networks, the buyer does not have an incentive to place a time limit for the period of time such periodic searches are to be conducted. However, the shorter the time interval, the greater is the traffic burden on the network. Hence, the current pull notification system network is heavily burdened with redundant automatic searches that are sometimes conducted even after the buyer has decided not to purchase the product or service.

Under this push notification invention, there is there is no need for any centralized intelligence for performing the matching of attributes. The intelligence for performing attribute matching lies in each user application.

Also, under this push notification invention there is no need for a large centralized database to store the user's attribute information. The user's attribute information is stored either locally in the device hosting the user's application or is stored in a distributed database spread across the event driven network.

Also, under this push notification invention the user can send the search query to either all the users in the network or to a specific group of users. The user can specify the radius within which the search is to be conducted. The application allows a user to easily perform off-line zip code look-ups, and distance and radius calculations.

Also, under this push notification invention when a successful match between the attributes occurs, the two users can continue the transaction external to the network, thereby eliminating any mediator between the interested parties.

Also, under this push notification invention, the user applications can include computers, personal digital assistants, wireless handsets, landline phones and other forms of computing and communicating equipments. Notifications can be sent between multiple types of user applications.

Also, this push notification invention allows the optional rating of the sellers by individual buyers without any centralized intervention. When a search is initiated, higher rated sellers will be listed above lower rated sellers, with the seller-rating data being stored, like the match information, at the end-points of the network.

Also, this push notification invention allows the user to create and send out multiple search queries using the same user interface window. This allows the user to conduct multiple transactions simultaneously.

DETAILED DESCRIPTION OF THE INVENTION

Figure 1A:
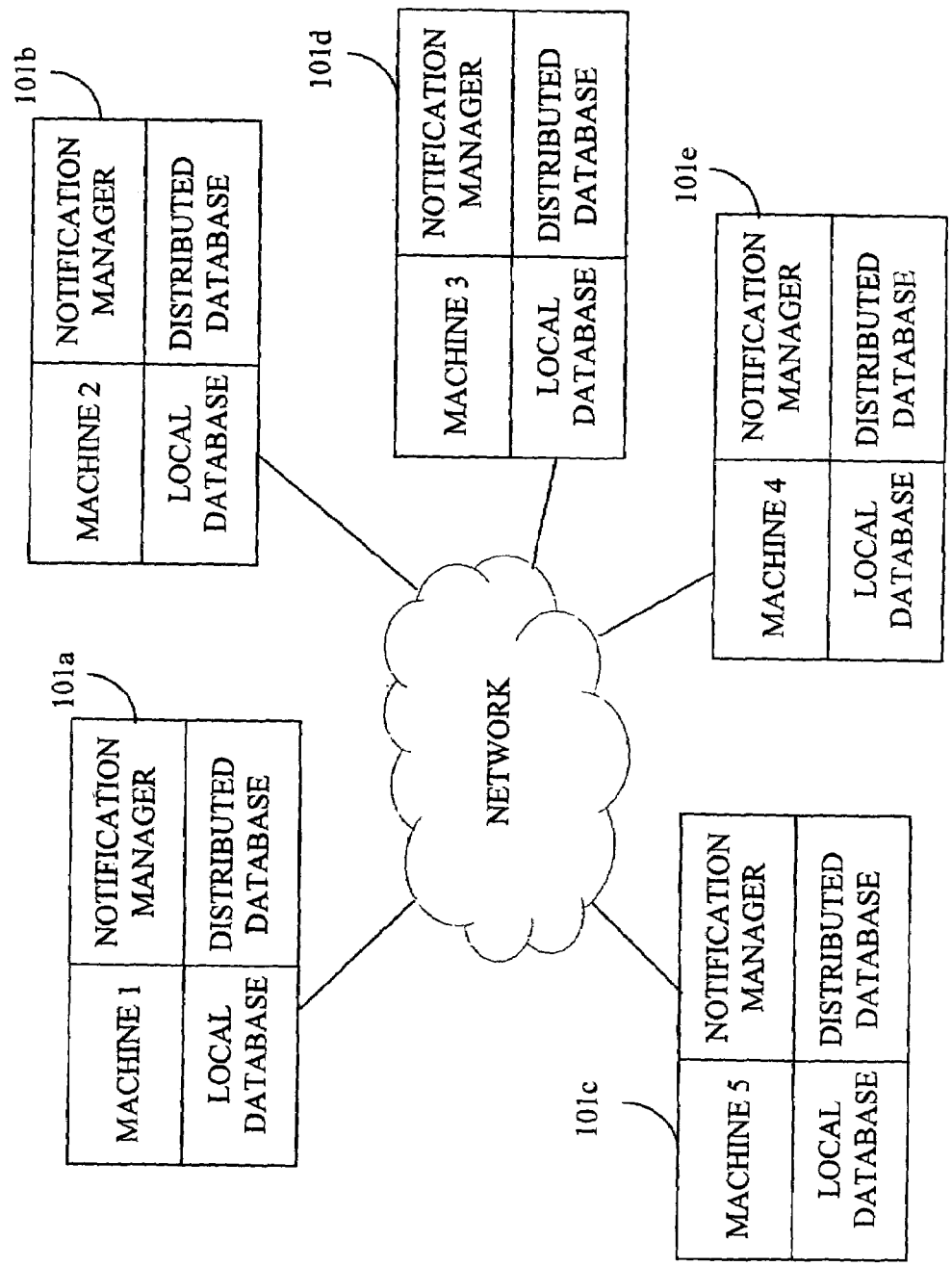
FIG. 1A illustrates the architecture of an event driven event driven network with a distributed database used for storing logical names.

FIG. 1A illustrates a system of user applications (101a, 101b, 101c, 101d, 101e) connected to one another by an event driven network and the structure of the event driven network. The user application (101a, 101b, 101c, 101d, 101e) can reside in, but are not limited to residing in communication devices such as a computer, personal digital assistant or a wireless communication device. A combination of different forms of communication devices can be used. For example, the event driven network can contain a mix of personal digital assistants, cell phones and computer desktops. The event driven network can be a local area network, wide area network or the internet. It can also be restricted to an enterprise network. Each user application is reachable by any other user application in the event driven network. The user application contains a notification manager for sensing a change in attributes and for notifying the change to other users of the event driven network. A storage database is used for storing the attribute information of the user application, wherein the database is either located in the device hosting the user application or the database is a distributed database spread across multiple devices in the event driven network.

A new user is permitted to join the event driven network through registration of its attributes, subnet choices and its logical name. The subnet choices define the group of users within the event driven network that the user wishes to transact with. For example, a buyer may desire to buy a car from sellers located in his hometown. He would then set the subnet to only include users of the event driven network who are located within a certain distance from his residence, or to a named set of users, or to an automatically determined subnet of users on the network, for example, via a table look-up.

Figure 1B:
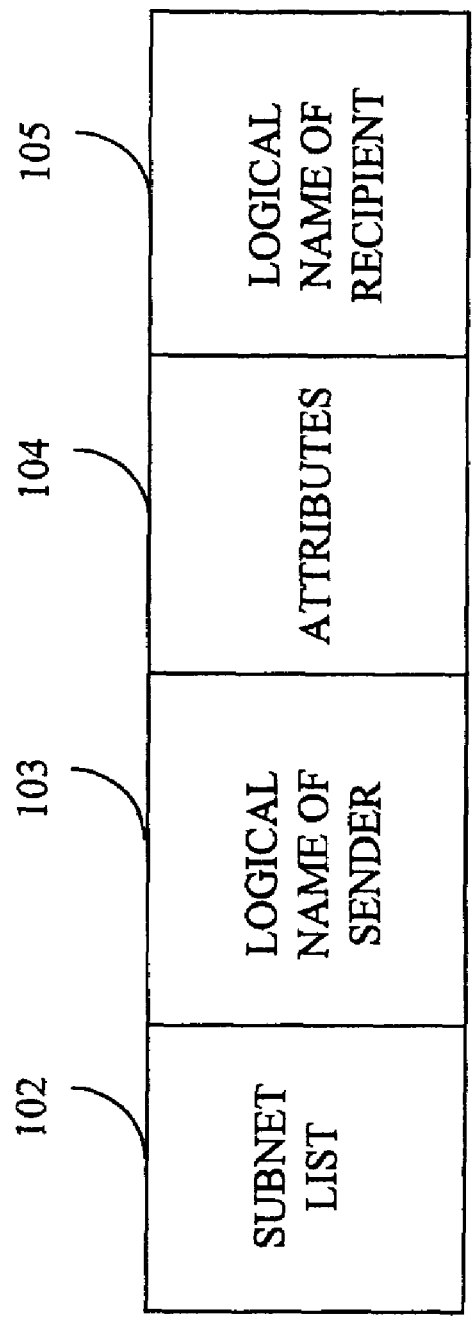
FIG. 1B illustrates the structure of the packet used for transmission by the user applications.

FIG. 1B illustrates the information stored in the packets transmitted by the user applications. The packet contains a subnet list 102 addressed to a particular group of target users. The subnet can also be extended to the entire network of users. The packet stores the sender logical name 103, attributes of the item 104, attributes of the user and the logical name of the recipients 105.

Each user in the event driven network generates a specific user attribute profile that contains information on the characteristics of the user and the specifics of the transactions the user wishes to enter into. The user attribute profile of each user is stored in the storage database. Note that the storage database is either the local database of the device in which the user application is hosted, or a distributed database in the event driven network. For example, a user may desire to purchase a car with an odometer reading of less than 20,000 miles, manufactured by BMW and at a maximum price of $40,000. Hence, this purchase request consisting of the odometer reading, car model and price attributes are stored in the storage database of the user.

Figure 2:
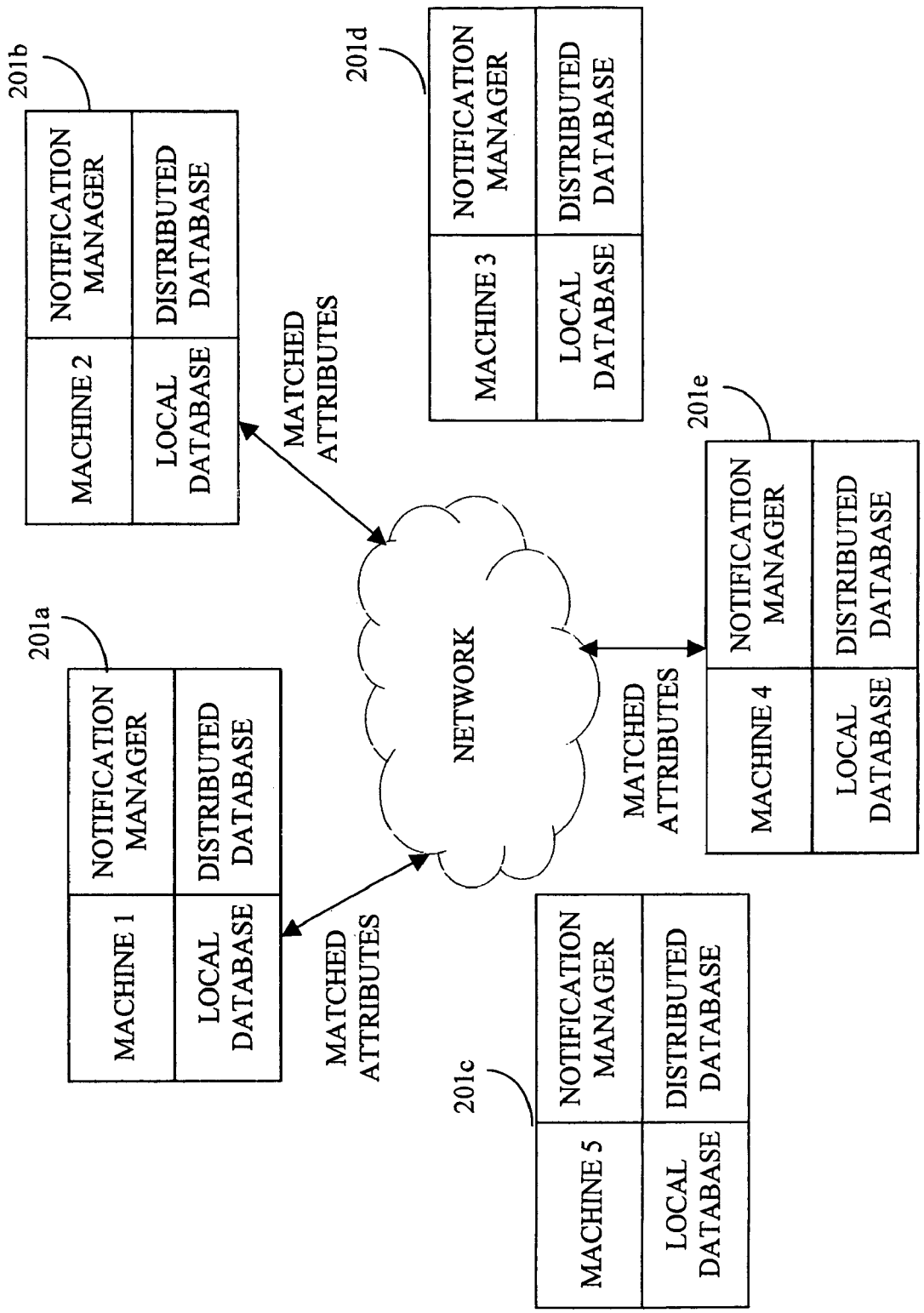
FIG. 2 illustrates the transmission of the notification from the matched user to the sender of the request.

FIG. 2 describes the activities that are initiated when a user updates his or her user attribute profile or generates a query request. The notification system in the user application (201a, 201b, 201c, 201d, 201e) detects the changes in the attributes of the local database and a subsequent notification is sent to a chosen set of users (201a, 201b, 201e), or is broadcasted to all the users (201a, 201b, 201c, 201d, 201e) in the entire event driven network. The user can change his or her attribute profile either when they are logged on to the network, or even when they are logged out of the network. When a user updates his or her user attribute profile or generates a query request, packets with information on the changed attribute is transmitted to all user applications (201a, 201b, 201c, 201d, 201e) whenever the user is logged in the event driven network. The choice of transmitting to one or more subnets or broadcasting to the entire event driven network is determined by the transmitting user's preference. When the receiving user applications receive an incoming query request or an updated user attribute profile, the notification system in the receiving user application checks if any of the attributes of the updated user attribute profile matches with any one of the receiving user's attributes that is stored in the receiving users local database or distributed database. The attributes at the receiver's user application (201a, 201b, 201c, 201d, 201e) will include the characteristics of the search query that the receiving user application (201a, 201b, 201c, 201d, 201e) has conducted in the past and which the receiving user application (201a, 201b, 201c, 201d, 201e) is continuing to pursue. If one or more of the attributes successfully match between user applications, the receiving user application (201a, 201b, 201e) sends a response to the sender that a successful match has been found. It is possible to vary the matching algorithm by allowing multiple-word matches. Next, the buyer and seller user applications will communicate with each other and decide on whether they wish to continue with the transaction. If the buyer and seller do not wish to continue, the transaction is terminated. When a match is found for the search query and transaction is compete, for example when an article is successfully located and purchased by the buyer, the system can be optionally configured to notify all other users that the item is no longer available or is out of stock.

For example, consider the case of John Smith who places a search for a used Harry Potter novel at a price of $10. Assume that at 1:00 P.M. when he conducts the search for the novel over the event driven network, he is unable to find a seller for the novel. Assume that at 2:00 P.M., Jerry Carter placed his Harry Potter novel for sale to all the users over the event driven network. When Jerry Carter updates his local database with the attributes of the book and its price, this information is broadcast to all users of the network. This update notification will reach John Smith through the event driven network the instant the information is updated in Jerry Carter's user application. For example, Jerry Carter's user application may reside in a smart phone that contains a computer with wireless communication capability, and John Smith's device may be a desktop computer communicating with the event driven network through a wire line.

Figure 3:
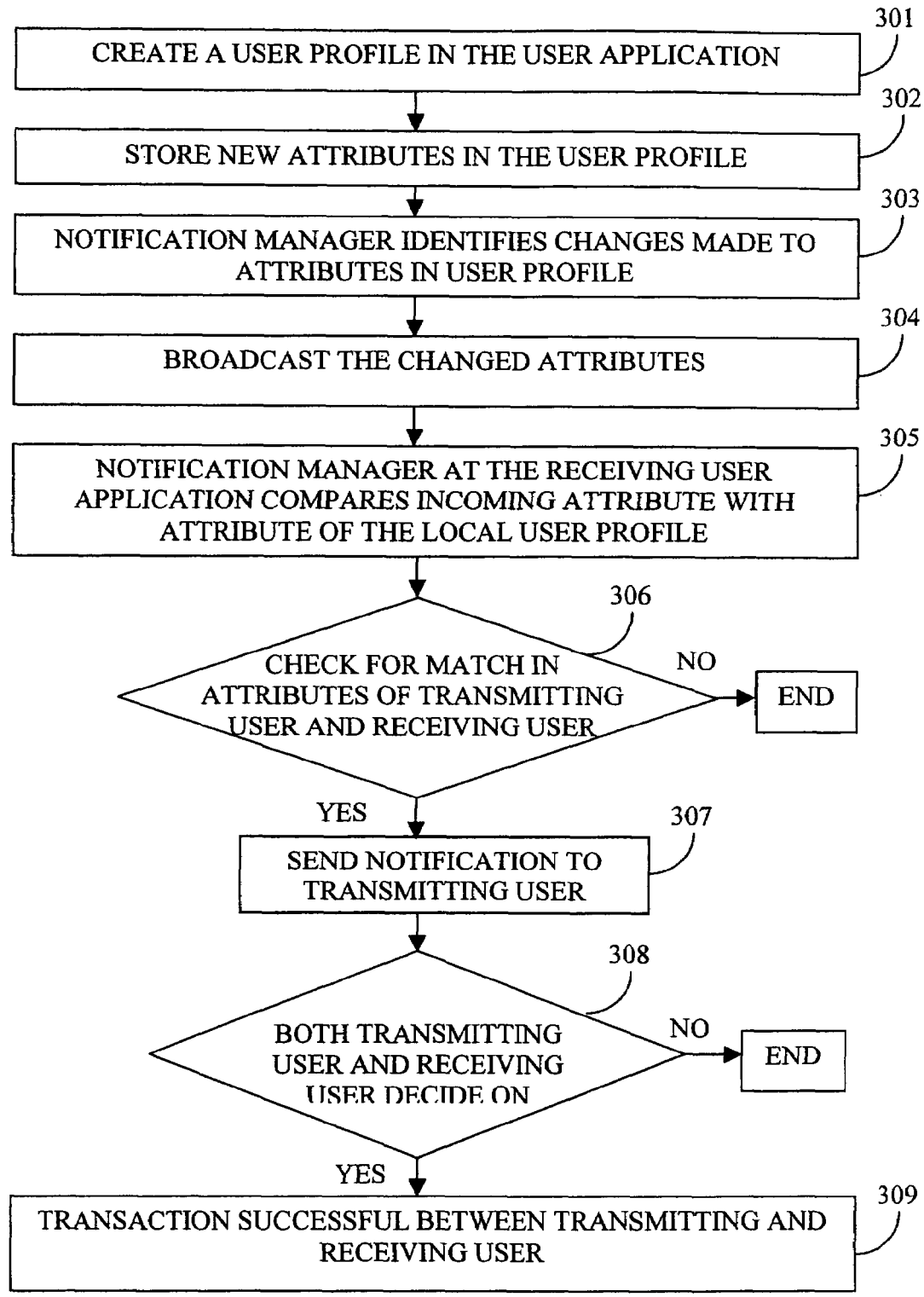
FIG. 3 illustrates the mechanism of real time update notification when there is a change in the attributes of a user application.

FIG. 3 illustrates the mechanism of real time update notification when there is a change in the attributes of a user application. This invention discloses a computer implemented method of matching attributes across an event driven network of user applications, through broadcast of the change notifications to a subnet of transacting user applications in the event driven network.

A network of user applications is created wherein each user application has a set of one or more up-datable attributes. An attribute profile for the user is generated for every user application in the network, wherein an attribute profile consists of a set of sub-attributes, each of which is a set of bytes of information 301. The new attribute of the user application is stored in the user's profile in a database 302. The attribute profile is transmitted to other user applications over the event driven network. The user applications exchange information with one another other either directly, or indirectly using one or more transmission protocols. The information of any changed attribute in the attribute profile is recorded by a user application 303 and the changed attribute is broadcasted to one or more user applications in the event driven network 304, the broadcasting occurring immediately after any attribute in the attribute profile of the user application is changed. One or more sub-attributes of an incoming attribute profile is compared with one or more sub-attributes of the stored attribute profile of the receiving user application 305 by the notification manager. The matching of the sub-attributes is performed within the receiving user application 306, which precludes the need for a centralized matching engine. The step of comparing one or more sub-attributes is implemented by a set of matching instructions for the attributes, with the matching instructions being stored in any user application thereby precluding the need for a central user application or central device.

In the event of a successful match, a notification is created and transmitted to one or more of the transmitting user applications on the network 307. The transaction is successful 309 if both the transmitting user and receiving user execute 308 the transaction. The transmitting user is defined as user whose changed attribute is being broadcasted. The receiving user is defined as a user who is receiving the changed attributes of the transmitting user. The notification of a change of the attribute of a user application can be sent through a number of user notification devices. The notification system is fully automated, wherein the user is notified with information about the detected condition. If done via telephone and an interactive automated system, a voice recognition system or a touch-tone system is used so that once contacted the user may obtain additional information about the user item. The system can be coupled to an e-mail server so that system can notify users of detected conditions using an e-mail process.

The notification manager includes a time provider that provides a time-out period for a notifying the user. The time-out period can specify a time duration or expiration period, wherein the user notification expires after the expiry of the time period. At times, communication may be lost between the notification delivery service and the user. Hence, acknowledge communication codes are employed to acknowledge error free transmission and indicate corrupt transmission or no transmission.

If one or more of the attributes of a buyer and seller match, the user is notified, and the system allows the matching algorithm to be customized by matching multiple words concurrently. Notification of the communication of a successful match of attributes may be accomplished via several means. Examples of notification means include, but are not limited to, e-mail notification, telephone, fax and beeper. The user may rank these notification choices and have the notification system attempt to contact the user based on the ranking of the preferences. If the user is not available by using the first notification means, then the matching services tries to reach the user by using the next notification means. A default notification means may also be provided. When both the sender and recipient agree upon the deal, they may choose to by-pass the entire event driven network and communicate externally to the network.

Figure 4:
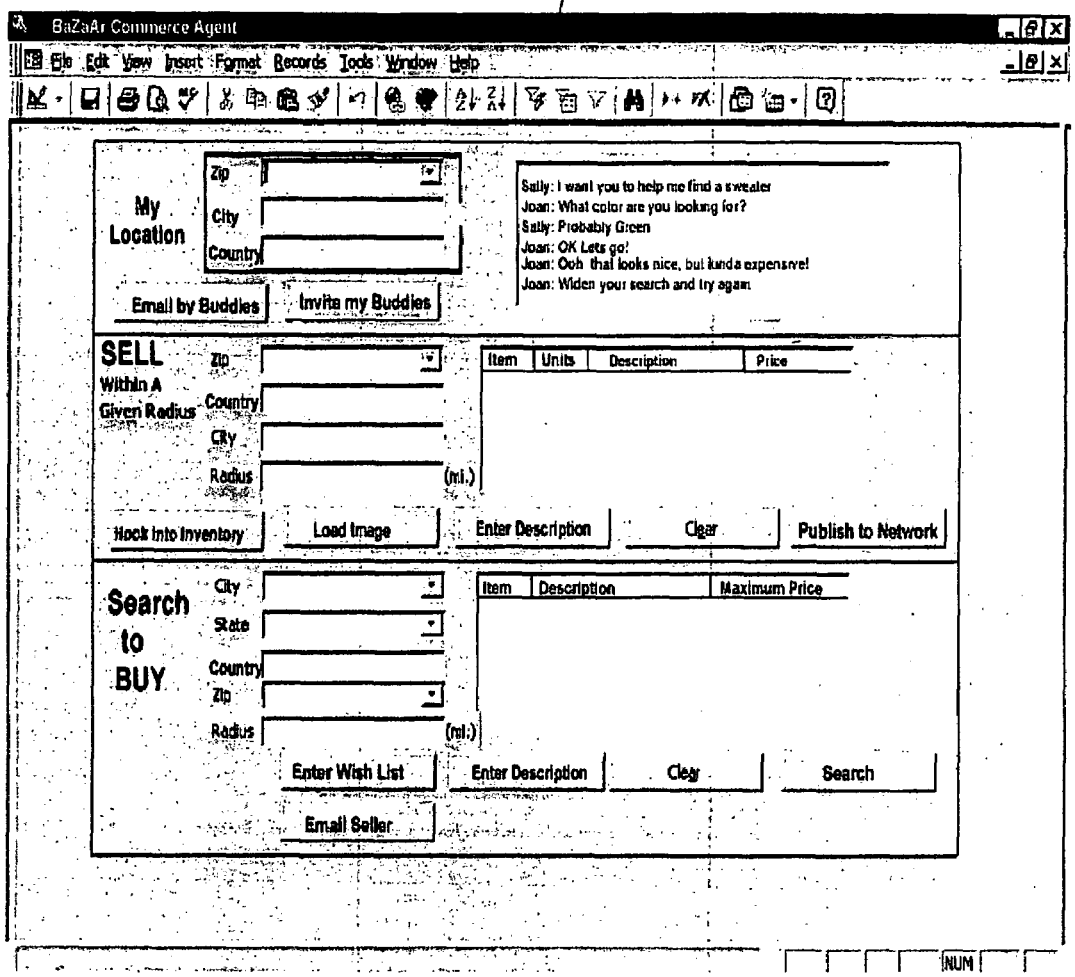
FIG. 4 illustrates one possible user interface for conducting a search query.
Figure 5:
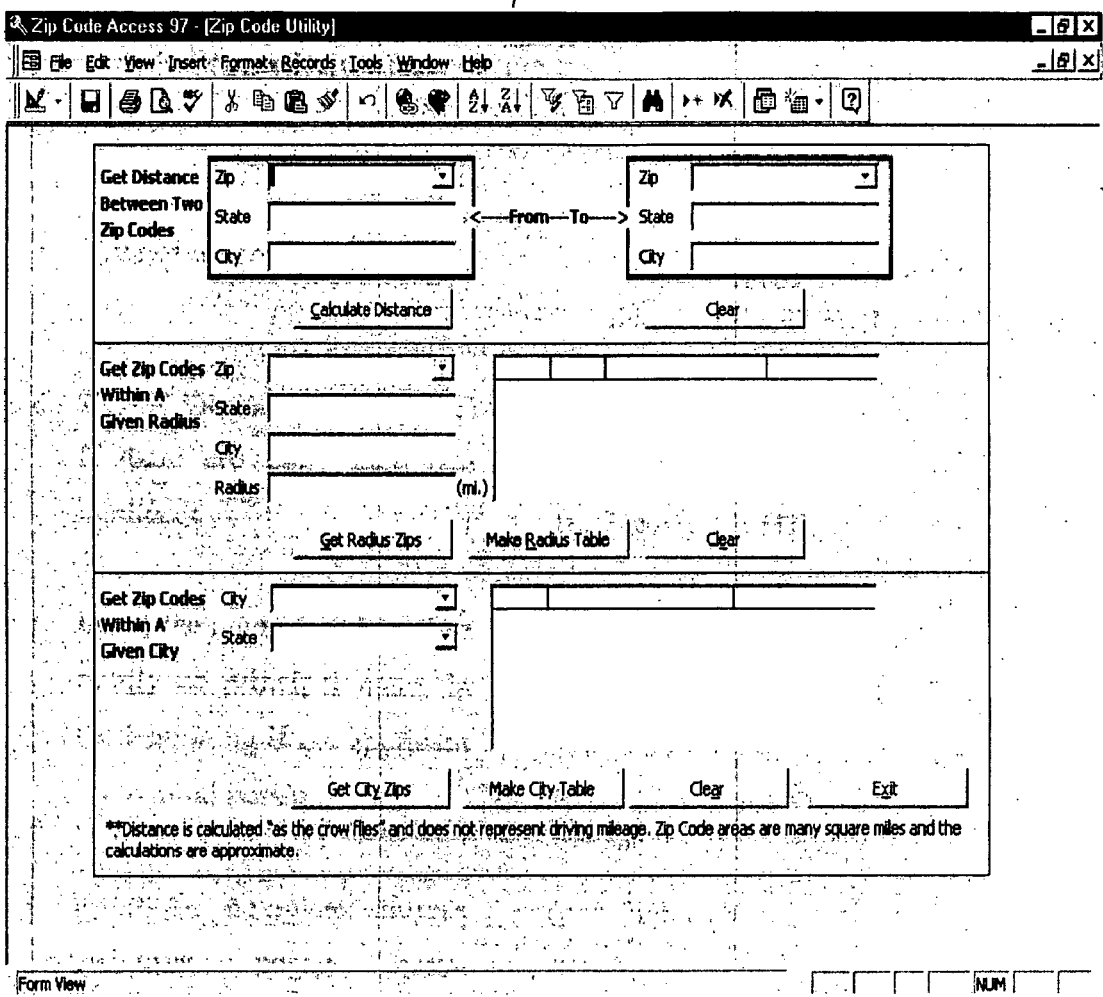
FIG. 5 illustrates one variant of a user interface for a zip code query.

FIG. 4 illustrates the user interface window 401 used to send search queries. Apart from the buy and sell usage, the system may also be used for job searching, e-commerce, personal match making and business solutions. In all these applications, the user interface window can be suitably modified according to the user requirement. For example, consider an application of this invention for buying and selling articles. The geographical area within which the search is restricted is defined by specifying the country zip code and the radius of a particular region. The desired number of articles, the article's product specification and the price are entered. For example, if a person desires to sell a book for $10, the user enters the specification of the book such as the name of the book, publisher of the book and the price of the book in the description column of the user interface window as shown in FIG. 5. The user then specifies the geographical vicinity within which he or she wants to buy or sell the book. By specifying a geographical vicinity, the buyer defines target subnets to which the buyer's message is transmitted. If the buyer has no specific seller preference, the buyer can also choose to broadcast the query to application users on the entire event driven network.

FIG. 5 illustrates an interface window 501 used to perform off-line zip code look-ups, distance and radius calculations.

I claim:

1. A computer implemented method of matching attributes across an event driven network of user applications through broadcasting change notifications to a subnet of transacting user applications in the event driven network, comprising the steps of:

creating a network of user applications, wherein each user application has a set of one or more updatable attributes;

generating attribute profiles for users of one or more user applications in the network, wherein an attribute profile consists of a set of sub-attributes, each said sub-attribute comprising a set of bytes of information;

storing the user application attribute profile in a database;

transmitting the attribute profile between the user applications over the event driven network, wherein the user applications exchange information with each other either directly or indirectly using one or more transmission protocols;

detecting changes in one or more sub-attributes of the attribute profile;

broadcasting the information of any changed attribute in the attribute profile recorded by a user application to one or more user applications in the event driven network, said broadcasting occurring in response to changes in any attribute in the attribute profile of the user application;

comparing one or more sub-attributes of an incoming attribute profile with one or more sub-attributes of the stored attribute profile of the receiving user application, wherein matching is performed within the receiving user application whereby the need for a centralized matching engine is precluded, and wherein the step of comparing one or more sub-attributes is implemented by a set of matching instructions for the attributes, with the matching instructions stored in any user application thereby obviating the need for a central user application or central device; and creating and transmitting a notification over the network from the receiving user application in the event of a successful match between the incoming attribute profile and the stored attribute profile, wherein said notification is transmitted to the users associated with matched attribute profiles.

2. The computer implemented method of claim 1, wherein each user application is accessible by every other user application in the event driven network.

3. The computer implemented method of claim 1, wherein the attribute profile comprises any information of transactional interest to the user.

4. The computer implemented method of claim 1, wherein the user application can reside in a computer, personal digital assistant or a wireless handset.

5. The computer implemented method of claim 1, wherein the event driven network is an enterprise network, local area network or a wide area network.

6. The computer implemented method of claim 1, wherein at least two of the user applications can communicate independent of a third user application in the event driven network.

7. The computer implemented method of claim 1, wherein the event driven network is a peer to peer network, wherein each user's computer is accessible by another peer though one or more hops.

8. The computer implemented method of claim 1, wherein the step of transmitting notification of a successful match occurs for one or more matches of attributes after a comparison of the changed attribute with the stored attribute profile of the user.

9. The computer implemented method of claim 1, wherein the step of generating a an attribute profile by a user includes setting an expiry time for notification.

10. The computer implemented method of claim 1, wherein the step of changing an attribute occurs when the user application is either logged in or logged out of the event driven network.

11. The computer implemented method of claim 1, wherein the step of sending a notification of a successful match is executed through one or more communication means comprising e-mail, short message service, pop up electronic messages, fax message and phone call.

12. The computer implemented method of claim 1, wherein the step of generating an attribute profile includes specifying the means of communication in the event of a notification.

13. The computer implemented method of claim 1, wherein the subnet is defined by the geographical location or area of interest of the user.

14. A system for matching attributes across an event driven network of user applications, comprising:

one or more user applications residing on a plurality of devices for generating attribute profiles for users of said one or more user applications, wherein said plurality of devices are disposed on said event driven network;

a database interconnected with each of said user applications for storing attribute information of the user application, wherein the database is located in the device hosting the user application;

a notification manager embedded in each of the user applications for sensing changes in attributes in the database and transmitting the information on the changed attributes to other user applications over the event driven network, wherein said transmission occurs in response to changes in any attribute in the attribute profile of the user application; and said one or more user applications for storing a set of matching instructions for comparing an incoming attribute profile with one or more attributes of the stored attribute information, wherein said matching is performed within a receiving user application whereby the need for a centralized matching is precluded.

15. A computer implemented method of matching attributes across an event driven network of user applications through broadcasting change notifications to a subnet of transacting user applications in the event driven network, comprising the steps of:

creating a network of user applications residing on a first plurality of user devices, wherein each user application has a set of one or more updatable attributes;

generating attribute profiles for users of one or more user applications in the network, wherein an attribute profile consists of a set of sub-attributes, each said sub-attribute comprising a set of bytes of information;

storing the user application attribute profile in a database;

transmitting the attribute profile between the user applications over the event driven network, wherein the user applications exchange information with each other either directly or indirectly using one or more transmission protocols;

detecting changes in one or more sub-attributes of the attribute profile;

broadcasting the information of any changed attribute in the attribute profile recorded by a user application to one or more user applications in the event driven network, said broadcasting occurring in response to changes in any attribute in the attribute profile of the user application;

comparing one or more sub-attributes of an incoming attribute profile with one or more sub-attributes of the stored attribute profile of the receiving user application, wherein matching is performed within the receiving user application whereby the need for a centralized matching engine is precluded, and wherein the step of comparing one or more sub-attributes is implemented by a set of matching instructions for the attributes, with the matching instructions stored in any user application thereby obviating the need for a central user application or central device; and creating and transmitting a notification over the network from the receiving user application in the event of a successful match between the incoming attribute profile and the stored attribute profile, wherein said notification is transmitted to a second plurality of user devices in possession of the users associated with matched attribute profiles.

16. The computer implemented method of claim 15, wherein said second plurality of devices comprises computers, personal digital assistants or wireless handsets.

17. The computer implemented method of claim 15, wherein the step of transmitting a notification of a successful match is executed through one or more communication means comprising e-mail, short message service, pop up electronic messages, fax message and phone call.

18. The computer implemented method of claim 15, wherein the step of generating an attribute profile includes specifying the means of communication in the event of a notification.

19. A system for matching attributes across an event driven network of user applications, comprising:

one or more user applications residing on a first plurality of devices for generating attribute profiles for users of said one or more user applications, wherein said first plurality of devices are disposed on said event driven network;

a database interconnected with each of said user applications for storing attribute information of the user application;

a notification manager embedded in each of the user applications for sensing changes in attributes in the database and transmitting the information on the changed attributes to other user applications over the event driven network, wherein said transmission occurs in response to changes in any attribute in the attribute profile of the user application; and said one or more user applications for storing a set of matching instructions for comparing an incoming attribute profile with one or more attributes of the stored attribute information, wherein said matching is performed within a receiving user application whereby the need for a centralized matching is precluded;

said notification manager for creating and transmitting a notification over the event driven network in the event of a successful match between the incoming attribute profile and the stored attribute profile, wherein the notification manager transmits said notification to a second plurality of user devices in possession of the users associated with matched attribute profiles.

20. The system of claim 19, wherein the database is distributed across the event driven network.

* * * * *